Feb. 16, 1960 J. H. CRANKSHAW 2,924,985
FLEXIBLE COUPLING V-DRIVE
Filed Oct. 24, 1955 2 Sheets-Sheet 1

INVENTOR.
JOHN H. CRANKSHAW
BY Charles L. Lovercheck
attorney

INVENTOR.
JOHN H. CRANKSHAW
BY
Charles L. Lovercheck
atty.

United States Patent Office 2,924,985
Patented Feb. 16, 1960

2,924,985

FLEXIBLE COUPLING V-DRIVE

John H. Crankshaw, Erie, Pa., assignor to American Flexible Coupling Company, Erie, Pa., a corporation of Pennsylvania Application October 24, 1955, Serial No. 542,145

6 Claims. (Cl. 74—378)

This invention relates to reverse reduction gear and coupling combinations and more particularly to coupling members for connecting a drive unit to an offset driven unit spaced from the axis of the drive unit.

An object of this invention is to provide a flexible shaft coupling between a drive element and a driven element and operated in a spaced position from each other.

Another object of the invention is to provide a clutching arrangement in combination with a flexible driven unit for operating a driven shaft member at an acute angle to the axis of a drive member.

A further object of the invention is to provide a coupling member which is simple in construction, economical in manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, portions, and minor details of construction without departing from the spirit or sacrificing any of the advantages of the invention.

Figure 1:
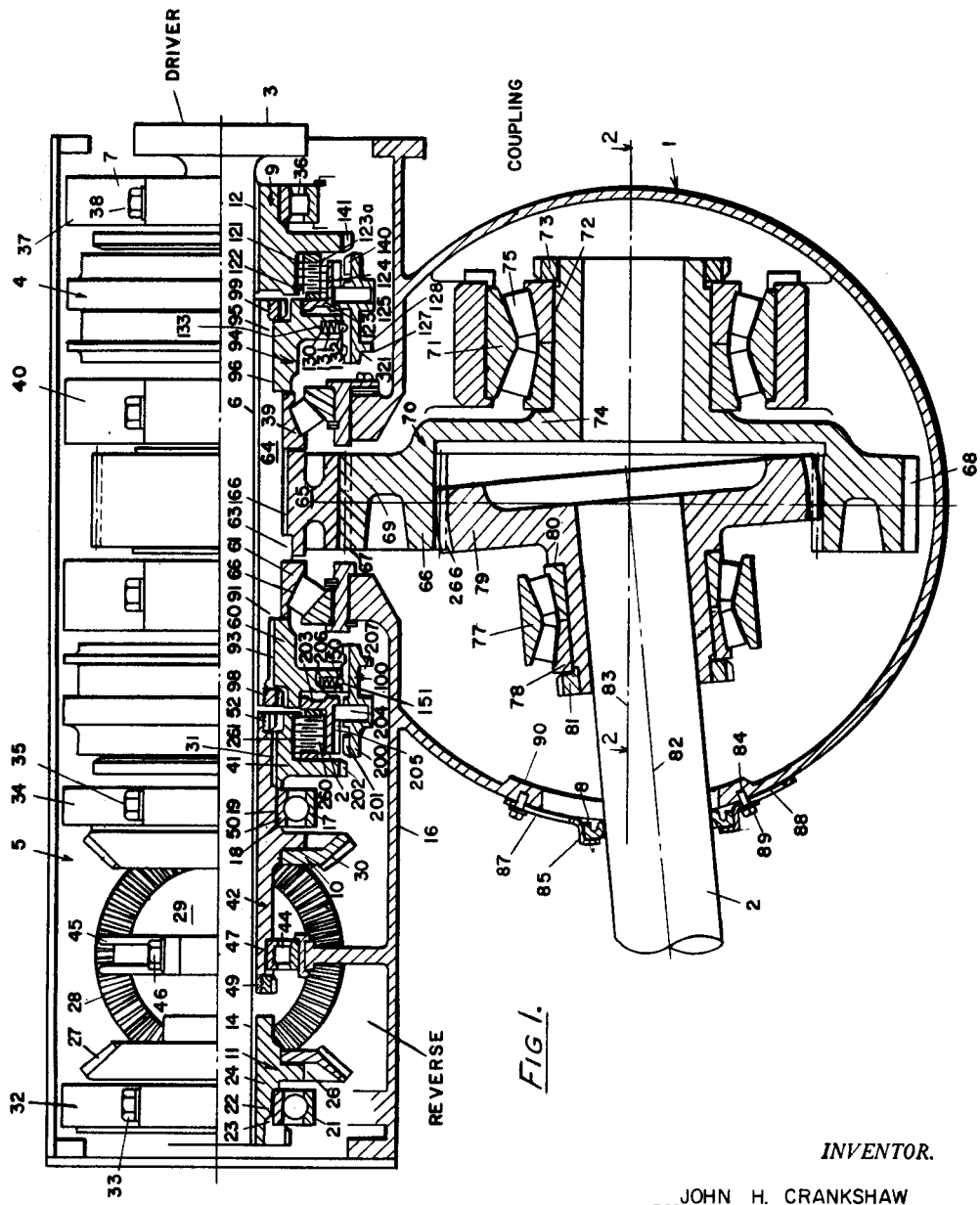
Fig. 1 is a longitudinal cross sectional view of a drive unit and clutching arrangement according to the invention.
Figure 2:
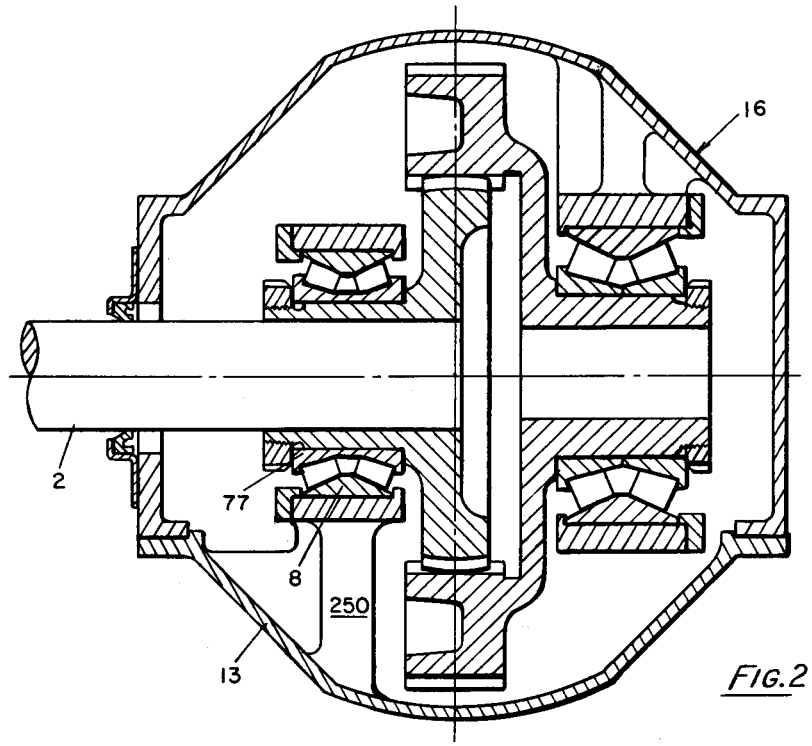
Fig. 2 is an enlarged view of the coupling used in the driven unit shown in Fig. 1.
Figure 3:
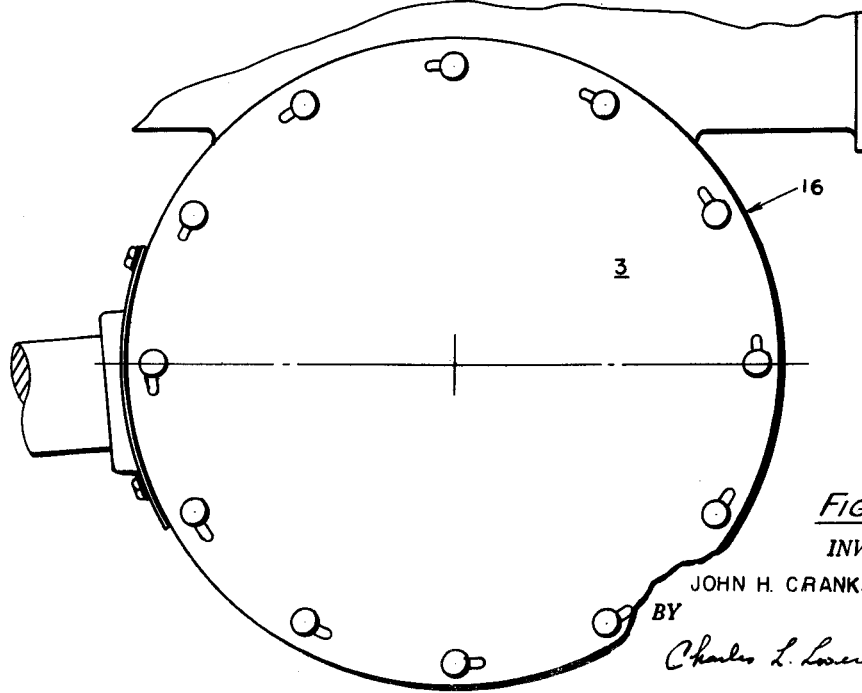
Fig. 3 is a view of the clutching arrangement shown in Fig. 3 with a cover plate thereon.

Referring now to the drawings, a drive unit is shown made up of a coupling 1 which connects a driven shaft 2 to a drive member at an acute angle thereto which may be connected to a flange 3 through a clutching arrangement 4 which operates a reversing mechanism 5.

The flange 3 is connected to a shaft 6 which extends through the coupling 1 and is keyed to a first externally toothed clutch member 9 and to a gear 11 at 12 and 14, respectively. The clutch member 9 is supported in bearings 7. A gear 10 is freely rotatable around the shaft 6 and is carried on a case 16 by a roller bearing 17 which engages an external hub 18 of the gear 10 at 19. The gear 11 is carried by a bearing 21 which is supported in the case 16 and engages an external hub 22 of the gear 11 at 23. The gear 11 has bevelled teeth 27 which engage teeth 28 on a ring gear 29. The gear 10 has teeth 30 which also mesh with the teeth 28 on the gear 29.

A bearing cap 32 holds the bearing 21 in clamped position on the case 16 by means of bolts 33 and a bearing cap 34 clamps the bearing 17 to the case 16 through bolts 35. A bearing 36 is held in clamped position in the case 16 by a bearing cap 37 held by bolts 38 and a bearing 39 is held in clamped position on the case 16 by means of a bearing cap 40.

A hub 42 of the gear 10 is carried on the case 16 by means of a roller bearing 44 which is clamped to the case 16 by a bearing cap 45 held in place by bolts 46. An inner race 47 of the bearing 44 is held clamped to the hub 42 by means of a nut 49 which threadably engages the end of the hub 42. An inner bearing race 50 of the bearing 17 is clamped between the external hub 18 and a second externally toothed clutch member 41 by means of a nut 52 and the clutch member 41 is held against relative rotation on the hub 42 by a key 31. Therefore, the flange 3 drives the shaft 6 and the gears 9 and 11 clamped thereto as a unit. This unit is carried by the bearings 36 and 21. The gear 10 is freely rotatable on the shaft 6 and the gear 10 is carried on the case 16 by means of the bearings 44 and 17.

A drive member 60 is carried on the case 16 by means of bearings 61 and 39. The bearing 61 has an inner race 66 locked against a shoulder 63 on a sleeve 64. The sleeve 64 is keyed to a gear 65 by a key 166. The gear 65 has teeth 67 which mesh with teeth 68 on a gear member 69 which is integral with a sleeve 70 of the coupling 1. The sleeve 70 is carried on the case 16 by means of a bearing 71 which has an inner race 72 mounted on the hub of the sleeve 70 and held thereon by a nut 73 which locks the inner race 72 against a shoulder 74 on the sleeve 70 with roller bearings 75 disposed therebetween. The driven shaft 2 is provided with a bearing 77 and an inner race 78 is held on an external gear 79 against a shoulder 80 thereof by means of a nut 81. The bearing 77 is supported on the case 16 by means of a structural member 250 which is integrally attached to the cover 13 of the case 16. It will be noted that the axis 82 of the shaft 2 may be operated in misalignment with the axis 83 of the external gear 79. The sleeve 70 has a hollow bore concentric with the axis thereof and internal teeth are formed in the hollow bore.

The sleeve 70 and the external gear 79 are enclosed in the enclosing case 16 which prevents dust from entering and retains lubricant. The shaft 2 extends through an opening in a grease retaining member 85 which has a U-shaped packing washer 86 therein. The grease retaining member 85 has ears 87 attached thereto which have slots 88 in which studs 89 retain the ears 87 thereon; that is, the studs 89 are inserted in holes 84 in bosses 90 and, when tightened therein, positively locate the grease retaining member 85 with respect to the shaft 2.

The sleeve 64 has the drive member 60 keyed thereto at 93 and a clutch segment 94 keyed thereto at 95. The members 60 and 94 are held against shoulders 96 and 91 by means of nuts 98 and 99. The clutch segment 94 has a shifting sleeve 123 slidable thereon. A sleeve 100 has a ring gear 200 fixed thereto having internal gear like teeth 201 which are adapted to engage external teeth 202 of the gear 41. The sleeve 100 is telescopically slidable around a clutch member 203 and guided thereon by a pin 204 which slides in a cylindrical groove 205 and is limited in its movement by a stop 206. An actuating member such as a fork or sleeve which may be hydraulically actuated or otherwise moved is disposed in a groove 207. The clutch member 203 has a centrally disposed pressure ring and friction plates which are forced into engagement by the member 203 when the sleeve 100 is forced toward the gear 10. These plates start the clutch member 41 and drive it to synchronous speed before the gear teeth 201 and 202 mesh.

The operation and engagement of the gear teeth 201 with teeth 202 is similar to the operation and engagement of teeth 140 with teeth 141 and the cooperation of their respective components therewith. Clutch plates 121 have internal teeth thereon and the internal teeth engage external splined teeth 122. Clutch plates 123a have external teeth thereon and these teeth engage an internal spline 124 on a clutch member 125. A sleeve 127 has an external groove 128 therein which is adapted to receive a shifting fork or other device. A sleeve 130 which is attached to the shaft 6 by means of the nut 99 has a bore 131 which has a spring loaded ball 132 disposed therein and the ball 132 is urged outwardly by means of a spring 133.

To drive the driven member 2 in a forward direction, it is necessary to shift the gear like teeth 140 into engagement with the teeth 141 so that the driver attached to the flange 3 will drive through the clutch member 9, the segment 94, and through gears 69 and 79 to the shaft 2. The operator will push the shifting means in the groove 128 to the right. Therefore, the ball 132 will be in frictional engagement with the hole and will carry the clutch plates 123a into frictional engagement with the clutch plates 121 and start the gear 94 rotating with the clutch member 9 and when they have come up to approximately the same speed, the shifing fork can be urged further to bring the teeth 140 into engagement with the teeth 141.

To drive the shaft 2 in reverse, the operator will put a force to the left on the shifting means in the groove 207 which will be connected to the fork in the groove 128. This will pull the sleeve 127 to the left, disengaging the teeth 140 from the teeth 141. The frictional force of a ball 150 in a groove 151 will urge the sleeve 100 to the left, carrying clutch plates 260 into frictional engagement with clutch plates 261. This will start the clutch member 41 rotating with the gear 200 and will aid the teeth 201 to engage the teeth 202. Then, since the teeth 140 are disengaged from the teetch 141, the drive will be from the driver to the flange 3 through the shaft 6 to the gear 11, through the ring gear 29, to the bevelled gear 10, through the clutch member 41 keyed thereto, to the teeth 202 which will mesh with the teeth 201, then through the sleeve 100 to the drive member 60, through the gear 65 to the sleeve member 70, through the gear 79 having the external curved surface or crowned teeth 266 to the shaft 2. Since the drive is through the ring gear 29, a reverse motion will be given to the shaft 2. It will therefore be seen that the transmission disclosed herein can be operated when the shaft of the driving member is spaced from and out of axial alignment with a driven member and where the driven member must be driven by a shaft in various degrees of alignment with the driving member.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A transmission comprising a driving shaft, means to attach a driving member to said shaft, a first external gear concentrically disposed on said shaft, a sleeve, said sleeve having external teeth comprising a second external gear meshing with said first external gear, said sleeve having internal teeth formed therein, an externally toothed member having teeth having curved flank surfaces engaging said internal teeth of said sleeve, and a driven shaft attached to said externally toothed member, said driven shaft being adapted to operate with its axis disposed at an acute angle to said driving shaft.

2. The transmission recited in claim 1 wherein said driving shaft is attached to said first gear by means of a synchronizing clutch.

3. A transmission comprising a driving shaft, means to attach a driving member to said shaft, a first external gear concentrically disposed on said shaft, a sleeve having external teeth comprising a second external gear meshing with said first gear, said sleeve having internal teeth formed therein, a third external gear having teeth disposed in said sleeve with said teeth engaging said internal teeth, and a driven shaft attached to said third external gear, said driven shaft being adapted to operate with its axis disposed at an acute angle to said driving shaft.

4. A transmission comprising a driving shaft, a first externally toothed clutch member on said shaft and rotatable therewith, a rearward bevel gear keyed to said shaft, a second bevel gear having a second externally toothed clutch member attached thereto freely rotatable on said shaft, a ring gear meshing with said bevel gears and transmitting rotative force from said first bevel gear to said second bevel gear, a second external gear freely rotatable on said driving shaft, gear means attached to said second externally toothed clutch member to connect said second external gear selectively with said first externally toothed clutch member and with said rearward bevel gear whereby said second external gear may be selectively driven forward and rearward, a third external gear having external teeth on the outside thereof and internal teeth thereon, said second external gear being in operative engagement with said third external gear, a crowned tooth gear engaging said internal teeth, and a driven shaft attached to said crowned tooth gear and driven thereby with its axis disposed at an acute angle to said driving shaft.

5. The transmission recited in claim 4 wherein said means to attach said forward and said rearward gears to said first externally toothed clutch member comprises positive clutch elements having internal gear like teeth attached to said second external gear and selectively slidable into engagement with said forward gear and said rearward gear, and clutch plates attached to said first external gear selectively engageable with clutch plates on said forward gear and on said rearward gear whereby said internal gears may be rotated into synchronism with said forward gear and said rearward gear prior to engagement therewith.

6. A transmission comprising a driving shaft, a forward toothed member on said shaft and rotatable therewith, a rearward bevel gear keyed to said shaft, a second bevel gear having a first externally toothed member attached thereto freely rotatable on said shaft, a ring gear meshing with said bevel gears and transmitting rotative force from said first bevel gear to said second bevel gear, a second external gear freely rotatable on said driving shaft, gear like tooth means attached to said first externally toothed member to connect said second external gear selectively with said forward toothed member and with said rearward bevel gear whereby said second external gear may be selectively driven forward and rearward, a third external gear having external teeth and internal gear teeth formed thereon, said second external gear being in operative engagement with said third external gear, an external gear disposed in meshing engagement with said internal gear teeth, and a driven shaft attached to said last mentioned gear and driven thereby with its axis disposed at an acute angle to said driving shaft.

References Cited in the file of this patent

UNITED STATES PATENTS

| | | |
|---|---|---|
| 1,906,790 | Greve | May 2, 1933 |
| 1,961,426 | Morgan | June 5, 1934 |
| 2,028,500 | Cook et al. | Jan. 21, 1936 |
| 2,042,189 | Rabe | May 26, 1936 |
| 2,304,030 | Schmitter | Dec. 1, 1942 |